United States Patent [19]

Heitmann

[11] Patent Number: 5,054,346

[45] Date of Patent: Oct. 8, 1991

[54] APPARATUS FOR REPEATEDLY SEVERING RUNNING WEBS OF TIPPING PAPER AND THE LIKE

[75] Inventor: Bob Heitmann, Hamburg, Fed. Rep. of Germany

[73] Assignee: Körber AG, Hamburg, Fed. Rep. of Germany

[21] Appl. No.: 364,312

[22] Filed: Jun. 9, 1989

[30] Foreign Application Priority Data

Jun. 11, 1988 [DE] Fed. Rep. of Germany ....... 3819933

[51] Int. Cl.[5] ........................ B23D 25/00; B23D 19/00

[52] U.S. Cl. ........................................ 83/100; 83/152; 83/154; 83/345

[58] Field of Search ................. 83/100, 101, 176, 152, 83/154, 341, 336, 345

[56] References Cited

U.S. PATENT DOCUMENTS 2,311,692 2/1943 Potdevin .............................. 83/101
2,499,570 3/1950 Crafts ............................... 83/154 X
3,110,209 11/1963 Takehara .......................... 83/341 X
3,703,841 11/1972 Crawford ............................. 83/341
4,344,610 8/1982 Jeschke et al. .................. 83/101 X
4,943,341 7/1990 Mattei .............................. 83/341 X

FOREIGN PATENT DOCUMENTS 356 of 1862 United Kingdom .................. 83/101

*Primary Examiner*—Timothy V. Eley
*Attorney, Agent, or Firm*—Peter K. Kontler

[57] ABSTRACT

The running web of tipping paper in a filter tipping machine of the tobacco processing industry is repeatedly severed by successive knives on a rotary carrier while the leader of the web is attracted to the peripheral surface of a counterknife. The peripheral surface of the counterknife is provided with axially parallel grooves flanked by internal surfaces one of which cooperates with the cutting edge of a knife to progressively sever the web in a direction from one marginal portion toward the other marginal portion. The cutting edges of the knives are inclined with reference to the axis of rotation of the carrier in the radial direction as well as in the circumferential direction of the carrier. A rotary eccentric is provided to shorten and lengthen the path of movement of the web toward the counterknife in order to establish gaps between successively separated uniting bands and the leader of the web.

24 Claims, 4 Drawing Sheets

APPARATUS FOR REPEATEDLY SEVERING RUNNING WEBS OF TIPPING PAPER AND THE LIKE

BACKGROUND OF THE INVENTION

The invention relates to the severing apparatus in general, and more particularly to improvements in apparatus for repeatedly severing a running web of plastic, paper or other flexible material so that the web yields a series of discrete web sections. Apparatus to which the invention pertains can be utilized with advantage in filter tipping machines of the tobacco processing industry, namely in machines wherein sections of filter rods are united with plain cigarettes, cigarillos or cigars to form filter cigarettes, cigarillos or cigars of unit length or multiple unit length.

A filter tipping machine comprises means for assembling sections of filter rods with sections of tobacco containing rods (such as plain cigarettes) so that the sections form groups of coaxial rod-shaped articles. The machine further comprises a source of convoluted web of tipping paper, a paster which applies adhesive to one side of the web, an apparatus which subdivides the web into a series of so-called uniting bands, and a mechanism which drapes the uniting bands around successive groups of coaxial articles to thus convert the groups into filter cigarettes, cigars or cigarillos of unit length or multiple unit length.

As a rule, the web severing apparatus employs a drum-shaped counterknife and a rotary carrier for one or more knives which cooperate with the counterknife to sever the leader of the web in the space between the periphery of the counterknife and the path of orbital movement of the cutting edge or edges of one or more knives. A certain length of the leader of the web is attracted to the periphery of the counterknife by suction. Successively severed uniting bands are caused to adhere to successive groups of coaxial rod-shaped articles to be convoluted around the planes of abutment between the end faces of filter rod sections and the adjacent end faces of plain cigars, cigarillos or cigarettes.

The cutting edge of each knife on the rotary knife carrier extends transversely of the path of forward movement of the web with the periphery of the counterknife. Reference may be had to commonly owned U.S. Pat. No. 4,485,710 to Schlisio et al. The cutting edge of each knife strikes against the exposed surface of the leader of the web once during each revolution of the knife carrier to thus penetrate through the web and separate a uniting band therefrom. In other words, the cutting edge of each knife actually strikes against the peripheral surface of the counterknife once during each revolution of the knife carrier. Each cutting edge severs the web all the way from one marginal portion to the other marginal portion in a single step, i.e., any portion of a cutting edge penetrates through the web and contacts the peripheral surface of the counterknife simultaneously with each other portion of the same cutting edge. This is a so-called crush cutting operation.

In order to ensure that the web will be cut all the way from the one to the other marginal portion, the cutting edge of each knife must strike the web, and immediately thereafter the peripheral surface of the counterknife, with a considerable force with attendant generation of pronounced noise.

British Pat. No. 2,123,737 discloses a modified web severing apparatus wherein the counterknife carries a set of knives which are inclined with reference to the axis of the counterknife. Such knives cooperate with the knives of the knife carrier on which the knives are mounted in exact parallelism with the axis of rotation of the carrier. The arrangement is such that successive knives on the knife carrier cooperate with successive knives of the counterknife in order to ensure that the cooperating cutting edges of the knives are in a mere point contact with each other and the point of contact travels from one marginal portion toward the other marginal portion of the web. This contributes to a reduction of noise but such apparatus exhibits a number of other drawbacks, especially as concerns the cost of making, assembling and adjustment.

The British patent further discloses the advisability of reducing the speed of forward movement of the web immediately after the making of each cut to thus establish a clearance or gap between the trailing end of the freshly severed uniting band and the front edge of the freshly formed leader of the web. The establishment of such gaps is desirable in connection with further processing of successively formed uniting bands. The means for changing the speed of the web in order to ensure the establishment of gaps comprises a roller which is mounted on a lever having a follower which tracks a cam. The roller alternately shortens and lengthens the path of movement of the web on its way toward the counterknife to thus accelerate and decelerate the web in synchronism with angular movements of the counterknife. A drawback of this proposal is that the roller causes vibratory stray movements with attendant agitation of the web ahead of the counterknife and the making of unsatisfactory cuts. Stray movements are likely to develop when the web is advanced at a relatively high speed which is necessary in a modern filter tipping machine.

OBJECTS OF THE INVENTION

An object of the invention is to provide a severing apparatus which is constructed and assembled in such a way that it generates little noise, even when called upon to sever a running web (such as a web of tipping paper in a filter tipping machine) at a high or very high frequency.

Another object of the invention is to provide a severing apparatus which is not only quieter but also simpler and less expensive than heretofore known severing apparatus.

A further object of the invention is to provide an apparatus wherein stray movements of the web are negligible at the time the speed of the web is changed in order to establish gaps between successively separated portions of the web.

An additional object of the invention is to provide a machine, particularly a filter tipping machine, which embodies the above outlined severing apparatus.

Still another object of the invention is to provide novel and improved means for removing impurities from the severing apparatus.

A further object of the invention is to provide the apparatus with novel and improved means for varying the speed of the web on is way toward and with the counterknife.

An additional object of the invention is to provide the apparatus with novel and improved means for changing the length of severed portions of the running web.

Another object of the invention is to provide the apparatus with novel and improved means for selecting the width of gaps between successively severed portions of the web.

An additional object of the invention is to provide a novel and improved knife carrier for use in the above outlined severing apparatus.

A further object of the invention is to provide a novel method of severing running webs of paper or the like.

Another object of the invention is to provide a novel and improved counterknife for use in the above outlined severing apparatus.

SUMMARY OF THE INVENTION

The invention is embodied in an apparatus for repeatedly severing a running web of paper or the like, particularly for separating uniting bands from the leader of a web of tipping paper in a filter tipping machine of the tobacco processing industry. The improved apparatus comprises a rotary drum-shaped counterknife having a preferably cylindrical peripheral surface, at least one substantially axially parallel groove in the peripheral surface, and an internal surface which flanks one side of the groove, preferably that side which is located ahead of the groove in the direction of rotation of the counterknife. The apparatus further comprises means for supplying the web to the counterknife in such a way that the leader of the web overlies a predetermined portion of the peripheral surface including the groove, and a rotary carrier which is adjacent the counterknife and has at least one knife with an elongated cutting edge serving to penetrate into the groove once during each revolution of the carrier to sever the web in cooperation with the internal surface of the counterknife.

The cutting edge of the knife is preferably inclined with reference to the axis of the carrier in the radial and/or circumferential direction of the carrier. Such axis is or can be parallel to the axis of the counterknife. The cutting edge is or can be substantially straight.

The knife is preferably made and/or mounted in such a way that at least its cutting edge is yieldable in the circumferential direction of the carrier. For example, at least a portion of the knife can be made of a resilient material, such as spring steel.

The orientation of the internal surface and of the cutting edge is preferably such that the cutting edge is in a mere point contact with the internal surface during severing of the web, and the point of contact between the cutting edge and the internal surface preferably travels from one end toward the other end of the cutting edge.

The knife can be provided with a guide which enters the groove ahead of the cutting edge and locates the cutting edge with reference to the internal surface of the counterknife. For example, the guide can comprise a substantially tooth-shaped protuberance at one end of the cutting edge.

The web supplying means preferably comprises means for advancing the web longitudinally at a predetermined average speed, and the apparatus further comprises means for rotating the counterknife at a peripheral speed which at least slightly exceeds the average speed. The arrangement is preferably such that the counterknife is rotated at a predetermined speed, and the web supplying means includes means for advancing the web toward the peripheral surface of the counterknife at a plurality of speeds including a higher speed which equals or closely approximates the predetermined speed during severing of the web, and at a lower speed upon completion of a cut across the web so that a gap develops between the fresh leader of the web and the web portion which has been severed from the web. The advancing means defines for the web an elongated path which extends to the peripheral surface of the counterknife, and such advancing means includes means for varying the length of the path for the web in synchronism with rotary movement of the counterknife. The means for varying the length of the path for the web can include a rotary eccentric and two web guides (e.g., in the form of idler rollers) which flank the eccentric. The web is trained over the eccentric and at least one of the guide rolls so that, as the throw of the eccentric upon the web changes as a result of rotation of the eccentric about its own axis, the eccentric automatically changes the length of the path for the web. In accordance with a presently preferred embodiment, the eccentric has a substantially elliptical cross-sectional outline.

The apparatus preferably further comprises means for adjusting the position of at least one of the guide rolls relative to the counterknife in order to change the extent of variation of the length of the path. This might be necessary in order to increase the width of gaps between successively separated web portions and the leader of the web and/or to change the length of separated web portions.

The apparatus further comprises a paster or other suitable means for applying adhesive to one side of the running web, and the advancing means including the eccentric is preferably installed adjacent the path of movement of the web from the adhesive applying means to the counterknife.

The apparatus can further comprise means for cleaning the cutting edge of the at least one knife in order to remove impurities, e.g., fragments of web and/or incrustations of adhesive. Such apparatus can further comprise means for collecting impurities which are removed by the cleaning means. In accordance with a presently preferred embodiment, the cleaning means comprises a rotary brush (e.g., in the form of an elongated cylinder) having bristles which serve to sweep at least along the major part of the length of the cutting edge of the knife. The collecting means can comprise a second rotary brush, e.g., in the form of an elongated cylinder the axis of which is parallel to the axis of the brush forming part of or constituting the cleaning means. The arrangement is preferably such that the apparatus comprises means for rotating the brush of the cleaning means and that this brush rotates the brush of the impurities collecting means. This can be achieved by selecting the distance between the axes of the two brushes in such a way that the distance is less than the combined length of the radii of the two brushes, i.e., the tips of bristles on one of the brushes penetrate into the other brush and/or vice versa. The brush of the means for collecting impurities is preferably located radially outwardly of the path of orbital movement of the cutting edge of the knife about the axis of the knife carrier.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

DESCRIPTION OF PREFERRED EMBODIMENTS

The invention will be described with reference to an embodiment of the improved web severing apparatus which is installed in a filter tipping machine of the type known as MAX (manufactured and distributed by the assignee of the present application).

Figure 1:
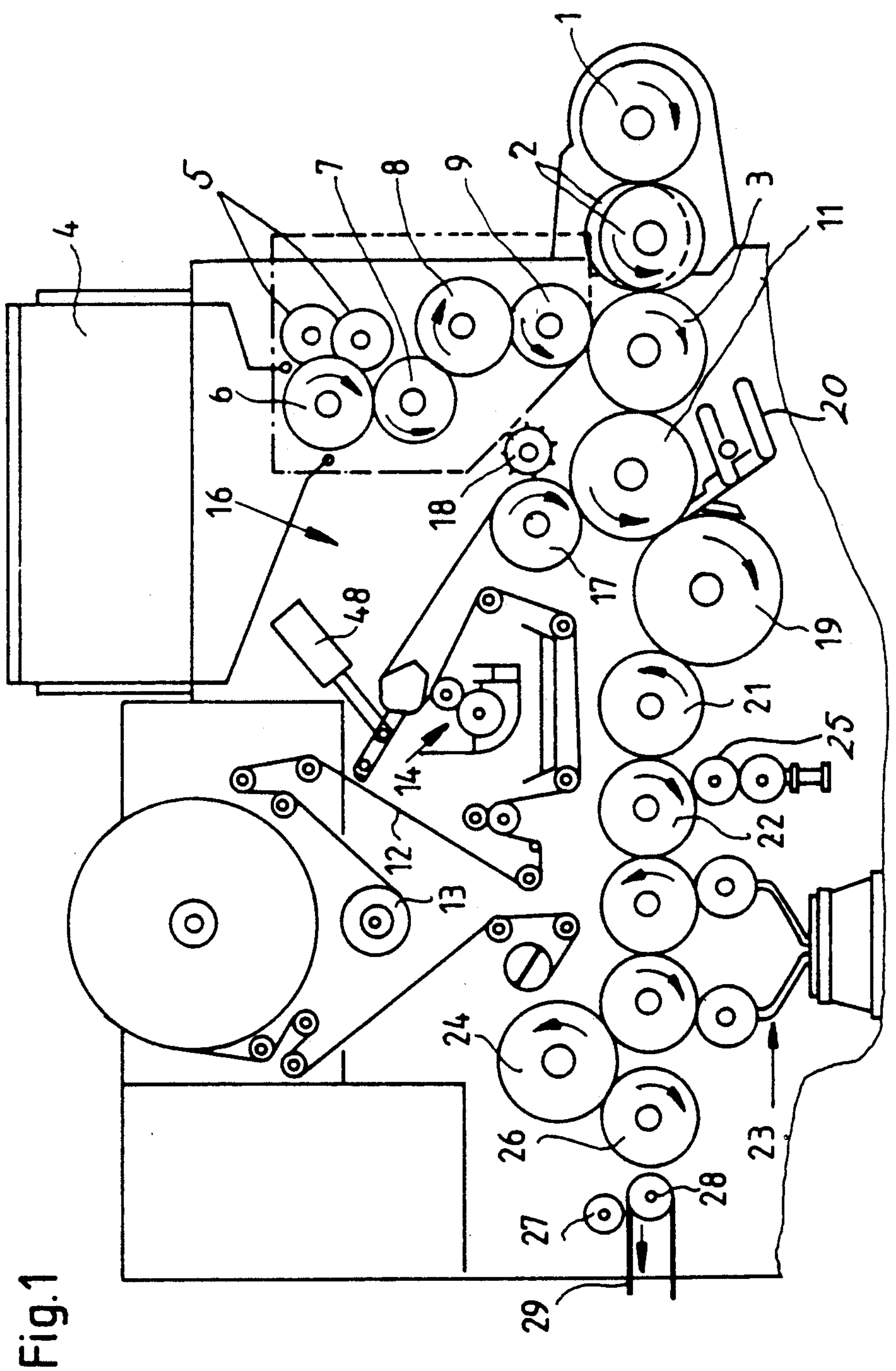
FIG. 1 is a front elevational view of a filter tipping machine having a web severing apparatus which embodies one form of the present invention.

The filter tipping machine which is shown in FIG. 1 comprises a rotary drum-shaped conveyor 1 which is mounted in the machine frame and receives two rows of parallel plain cigarettes of unit length from a cigarette rod making machine (not shown), for example, a machine known as PROTOS which is manufactured and distributed by the assignee of the present application. The conveyor 1 has axially parallel peripheral flutes, not specifically shown. Evenly numbered flutes of the conveyor 1 transport the cigarettes of one of the two rows, and the evenly numbered flutes transport the cigarettes of the other row. The cigarettes of one of the two rows are transferred into successive axially parallel flutes of one of two rotary drum-shaped aligning conveyors 2, and the cigarettes of the other row are transferred into successive axially parallel peripheral flutes of the other aligning conveyor 2. The aligning conveyors 2 transport the cigarettes of the respective rows through different distances and/or at different speeds so that each cigarette which is about to leave the respective flute of one of the conveyors 2 is in exact axial alignment with a cigarette in a flute of the other conveyor 2. Such pairs of axially aligned cigarettes are spaced apart from each other a distance which at least matches the length of a filter plug of double unit length. Successive pairs of axially aligned cigarettes (with gaps between them) are transferred into successive axially parallel peripheral flutes of a rotary drum-shaped assembly conveyor 3.

The top portion of the frame of the filter tipping machine of FIG. 1 supports a magazine 4 for a supply of filter rod sections of six times unit length. The outlet of this magazine is adjacent the axially parallel peripheral flutes of a rotary drum-shaped severing conveyor 6 which transports a series of parallel filter rod sections past two axially and circumferentially staggered rotary circular knives 5 serving to subdivide successive filter rod sections of six times unit length into sets of three coaxial filter plugs of double unit length. The plugs of successive sets of plugs are transferred into the axially parallel peripheral flutes of three discrete disc-shaped conveyors of a composite staggering conveyor 7 which staggers the filter plugs of each set of three plugs in the circumferential direction of its discs and delivers discrete filter plugs into successive axially parallel peripheral flutes of a rotary drum-shaped shuffling conveyor 8. The latter cooperates with stationary cams or with driven belts to convert the thus received filter plugs into a row wherein each preceding filter plug is in exact alignment with each following plug, and successive filter plugs of the thus obtained row are inserted into the gaps between pairs of plain cigarettes in the flutes of the assembly conveyor 3 by a rotary drum-shaped accelerating conveyor 9. Thus, each such flute of the assembly conveyor 3 which advances beyond the transfer station between the conveyors 3 and 9 contains a group of three coaxial rod-shaped articles, namely two plain cigarettes of unit length and a filter plug of double unit length between them.

The conveyor 3 transfers successive groups of three coaxial rod-shaped articles each into successive axially parallel peripheral flutes of a rotary drum-shaped transfer conveyor 11. The latter is adjacent a rotary drum-shaped counterknife 17 of a severing apparatus 16 which is constructed and assembled and operates in accordance with one embodiment of the present invention. The purpose of the apparatus 16 is to subdivide a running web 12 of tipping paper into uniting bands 38 (FIG. 2) of selected length. The counterknife 17 cooperates with a rotary knife carrier 18 of the severing apparatus 16 to repeatedly sever the leader of the running web 12 at the periphery of the counterknife. The latter attaches successive uniting bands 38 to successive groups of rod-shaped articles in the flutes of the transfer conveyor 11, and the conveyor 11 delivers the groups (each of which carries a uniting band 38) onto a rotary drum-shaped rolling conveyor 19. The conveyor 19 cooperates with a stationary or mobile rolling device 20 to convolute each uniting band 38 around the respective filter plug and around the adjacent inner ends of the respective plain cigarettes so that each such group is converted into a filter cigarette of double unit length.

Successive filter cigarettes of double unit length are transferred onto a drying drum 21 which promotes the setting of adhesive on the convoluted uniting bands, and the filter cigarettes of double unit length are thereupon transferred onto a rotary drum-shaped severing conveyor 22 which cooperates with a rotary circular disc-shaped knife 25 to subdivide each filter cigarette of double unit length into a pair of coaxial filter cigarettes of unit length. Such cigarettes form two rows one of which is accepted and transported by a turn-around device 23 without any changes of orientation of the respective cigarettes. The device 23 inverts the filter cigarettes of the other row end-for-end and places them between the cigarettes of the non-inverted row so that all filter cigarettes of unit length form a single row wherein the filter plugs (of unit length) of all cigarettes face in the same direction.

Successive filter cigarettes of the thus obtained single row are transferred onto a drum-shaped testing conveyor 24 which carries or is adjacent to means for monitoring one or more characteristics of each cigarette and generates signals in response to detection of defective cigarettes. Such signals are used to segregate the respective defective cigarettes from satisfactory cigarettes on the next-following drum-shaped (ejecting) conveyor 26. Satisfactory filter cigarettes of unit length are transferred onto the upper reach of an endless belt conveyor 29 which is trained over pulleys 28 (only one shown in FIG. 1) and cooperates with a braking roller 27. The conveyor 29 delivers satisfactory filter cigarettes of unit length into storage or to a packing machine, not shown.

FIG. 1 further shows an expiring bobbin 13 which constitutes a source of supply of the web 12 of tipping paper and is rotated in a direction to pay out the web. The web 12 advances along an adhesive applying device 14 (called paster) wherein one side of the web is coated (at least in part) by a suitable adhesive before it reaches the counterknife 17 of the severing apparatus 16.

Figure 2:
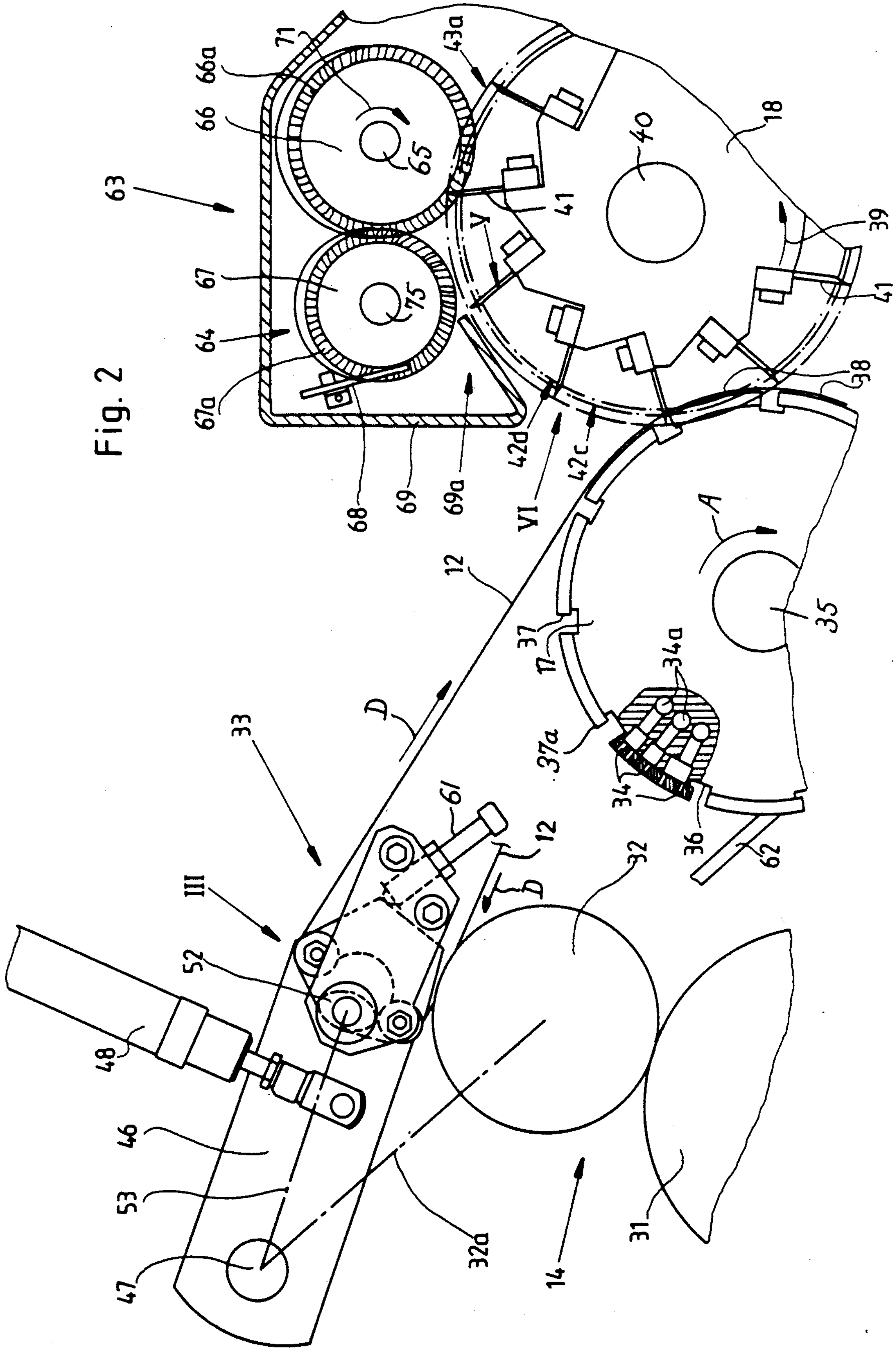
FIG. 2 is an enlarged view of the severing apparatus, with certain parts shown in section and with certain parts partly broken away.

The details of the severing apparatus 16 are shown in FIG. 2. The paster 14 comprises a lower roller 31 which dips into a supply of adhesive in a suitable tank and transfers a film of adhesive to the peripheral surface of a roller-shaped applicator 32 which applies the film to the underside of the web 12.

The means for advancing the web 12 toward and with the peripheral surface of the counterknife 17 includes radially extending suction ports 34 which are provided in the peripheral surface of the counterknife and communicate with axially parallel channels **34*a* provided in the body of the counterknife and connectable, in a conventional manner, with the suction intake of a suction generating device, e.g., a fan or a pump. The arrangement is such that the leader of the web 12 is attracted to a predetermined portion of the peripheral surface of the counterknife 17**.

The advancing means further comprises a device 33 which can change the length of the path for the web 12 between the applicator 32 of the paster 14 and the counterknife 17.

The suction generating means including the ports 34 in the peripheral surface of the counterknife 17 is designed in such a way that it enables the peripheral surface to slide relative to the leader of the web 12. This is desirable in order to ensure that successively formed uniting bands 38 will be separated from each other by gaps or clearances of preselected width. Such gaps are needed in order to prevent a next-following uniting band 38 from interfering with the application of the preceding (foremost) uniting band to the oncoming group of three coaxial rod-shaped articles on the transfer conveyor 11.

In accordance with a feature of the invention, the peripheral surface of the counterknife 17 is provided with at least one axially parallel groove 36 but preferably with a number of grooves 36 which are equidistant from each other in the circumferential direction of the counterknife. The latter is driven by its shaft 35 to rotate in a clockwise direction (arrow A). The front side of each groove 36 (as seen in the direction of arrow A) is flanked by an axially parallel and substantially radially extending internal surface 37 of the counterknife 17, and each such surface cooperates with the cutting edge 42 of a discrete knife 41 on the knife carrier 18 to make a cut across the leader of the web 12 when the counterknife 17 is rotated by its shaft 35 in the direction of arrow A and the carrier 18 is rotated by its shaft 40 to rotate in the direction of arrow 39.

In the severing apparatus 16 of FIG. 2 the axis of rotation of the counterknife 17 is parallel to the axis 44 of rotation of the carrier 18. The knives 41 extend transversely of the direction (arrows D) of advancement of the web 12 from the paster 14 toward the counterknife 17. Each knife 41 has an elongated cutting edge 42 (see particularly FIGS. 5 and 6) having two spaced apart end portions **42*a* and 42*b*. Each cutting edge 42 makes with the axis 44 of the carrier 18 a relatively small acute angle beta (as seen in the radial direction of the carrier), and each cutting edge 42 is also inclined relative to the axis 44 in the circumferential direction of the carrier 18 through a small acute angle alpha. The angles alpha and beta can be very small. The inclination of each cutting edge 42 relative to the axis 44 of the carrier 18 through the angle alpha ensures that the path 42*d* of orbital movement of the end portion 42*b* of each cutting edge 42 has a smaller diameter than the path 42*c* of orbital movement of the end portion 42*a* of each cutting edge. Therefore, each cutting edge 42 begins to make a cut at one marginal portion and proceeds with the making of the cut toward the other marginal portion of the web 12 when the counterknife 17 and the carrier 18 rotate in directions which are respectively indicated by arrows A and 40**.

The inclination of each cutting edge 42 relative to the axis 44 through the angle beta ensures that the internal surfaces 37 and the cutting edges 42 are in mere point contact with each other during the making of cuts, and the points of such contact travel from one marginal portion toward the other marginal portion of the running web 12. Each knife 41 is preferably a flat piece of metal; at least its cutting edge 42 is or can be straight. Moreover, each cutting edge 42 has at least some freedom of movement in the circumferential direction of the carrier 18 against the opposition of a restoring force. This can be achieved by making the knives 41 of a resilient material, by making those portions of the knives 41 which are provided with the cutting edges 42 of a resilient material (e.g., spring steel), or by installing one or more springs between each knife 41 and the adjacent portion of the carrier 18. If the knives 41 are biased by discrete springs, each such knife can be made of a rigid material.

Figure 5:
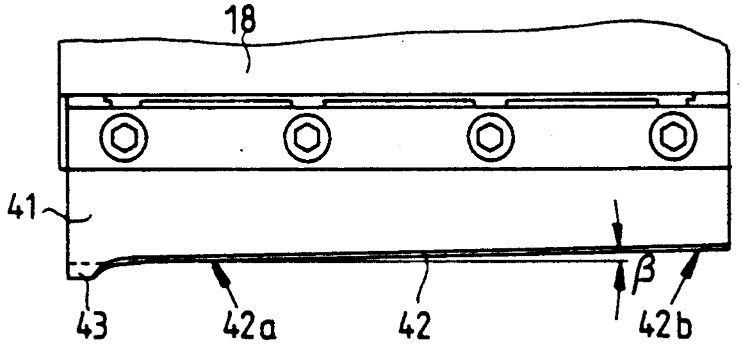
FIG. 5 is a fragmentary view of the rotary knife carrier substantially as seen in the direction of arrow V in FIG. 2.

Each knife 41 is preferably provided with a guide 43 (see particularly FIG. 5) which ensures proper introduction of the respective cutting edge 42 into the oncoming groove 36 of the counterknife 17. The guide 43 which is shown in FIG. 5 is a tooth-shaped protuberance extending radially outwardly beyond the respective end portion **42*a* of the cutting edge 42. The path of orbital movement of guides 43 about the axis 44 of the carrier 18 is indicated in FIG. 2 by a phantom-line circle 43*a*. It will be noted that the diameter of this path is greater than that which is denoted by the phantom-line circle 42*c* or 42*d* so that the guide 43 is first to penetrate into an oncoming groove 36. This ensures that the cutting edges 42 cannot strike against the peripheral surface of the counterknife 17 when the severing apparatus 16 is in actual use. Moreover, and as will be described with reference to FIG. 7, the guides 43 ensure that the respective cutting edges 42 are properly positioned with reference to the adjacent internal surfaces 37 and with reference to the cutting edges 37*a* which are defined by such internal surfaces with the adjacent portions of the peripheral surface of the counterknife 17**. Thus, the latter is provided with a number of axially parallel cutting edges even though it need not be provided with discrete knives corresponding to those on the counterknife of the aforediscussed British Pat. No. 2,123,737.

Figure 7:
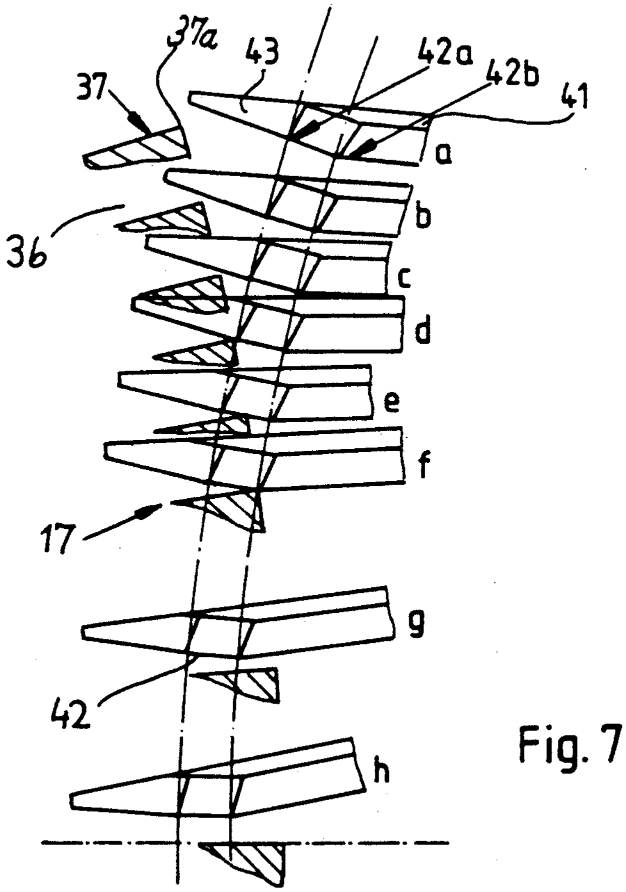
FIG. 7 is an enlarged fragmentary sectional view of the counterknife and a fragmentary end elevational view of a knife, showing different stages of a severing operation.

Referring to FIG. 7, it will be noted that when a knife 41 approaches the peripheral surface of the counterknife 17 to sever the leader of the web 12 (not shown in FIG. 7), the respective guide 43 approaches and gradually enters the oncoming groove 36 (this is shown in the stages a, b and c). The guide 43 does not or need not contact the internal surface 37 in the oncoming groove 36 (note the stages a and b). The next stage (c) of movement of the knife 41 and the adjacent portion of the peripheral surface of the counterknife 17 toward each other can involve actual contact between the guide 43 and the respective internal surface 37. The severing step begins during the next-following stage d of angular movement of the counterknife 17 and knife carrier 18 relative to each other, and the begin of this severing step involves essentially a point contact between the end portion 42a of the cutting edge 42 and the adjacent portion of the surface 37 and the groove 36 into which the guide 43 of FIG. 7 extends. The point of contact between the cutting edge 42 and the surface 37 advances along the groove 36 in a direction away from the respective end portion 42a (stage e), and the severing step is completed during or immediately after the stage f (the surface 37 is then contacted by the other end portion 42b of the cutting edge 42). The knife 41 is thereupon disengaged from the surface 37 (stages g and h) and its guide 43 leaves the groove 36 shortly thereafter during a next-following stage which is not shown in FIG. 7.

FIG. 7 shows that the cutting edge 37a between an internal surface 37 and the peripheral surface of the counterknife 17 cooperates with the adjacent cutting edge 42 not unlike the cutting edges on the blades of a pair of scissors so that the cut is made in a direction from one marginal portion toward the other marginal portion of the running web 12.

That side of the web 12 which is at least partially coated with a film of adhesive (applied in the paster 14 during advancement of the web toward the counterknife 17) is contacted by the cutting edges 42 of the knives 41 when the severing apparatus 16 is in use. Therefore, a certain amount of adhesive adheres to the knives 42 and is likely to incrustate which can adversely influence the quality and predictability of the severing operation. Layers of incrustated adhesive on the knives 41 constitute impurities or foreign matter which should be removed, either continuously or at requisite intervals, in order to ensure that the quality of the severing operation will be satisfactory irrespective of the frequency at which the leader of the running web 12 is severed, irrespective of the speed at which the adhesive on the knives 41 sets, irrespective of the thickness of the adhesive film on the web 12, and irrespective of the extent of self-cleaning action resulting from penetration of cutting edges 42 through the web 12 and into the adjacent grooves 36 of the counterknife 17.

In order to ensure that the quality of cuts will not be affected by contact between the cutting edges 42 and the film of adhesive on the web 12, the improved severing apparatus 16 is preferably provided with means 63 (FIG. 2) for cleaning the knives 41, most preferably with means for automatically cleaning the knives in response to start of operation of the severing apparatus. The illustrated cleaning means 63 comprises a cylindrical brush 66 having substantially radially extending bristles 66a which sweep along the full length of the cutting edges 42 of successive knives 41 when the severing apparatus 16 is in use. The means for rotating the brush 66 in the direction of arrow 71 comprises a shaft 65 which can receive torque from the main prime mover of the filter tipping machine or from a discrete motor, not shown. The distance between the axis 44 of the carrier 18 and the axis of the shaft 65 is selected in such a way that the tips of the bristles 66a invariably sweep along successive cutting edges 42 (along both sides of each cutting edge) when the shaft 65 rotates the brush 66 in the direction of arrow 71 and the shaft 40 rotates the carrier 18 in the direction of arrow 39. This results in automatic brushing away of layers of adhesive and/or other impurities, e.g., impurities which deposit on the layers of adhesive or which constitute fragments of the web 12. It has been found that the cleaning action of the brush 66 is particularly satisfactory if its peripheral speed is at least slightly higher than the speed of orbital movement of cutting edges 42 about the axis 44 of the carrier 18. Moreover, the cleaning action is enhanced if the shafts 40 and 65 are caused to rotate in opposite directions.

Figure 6:
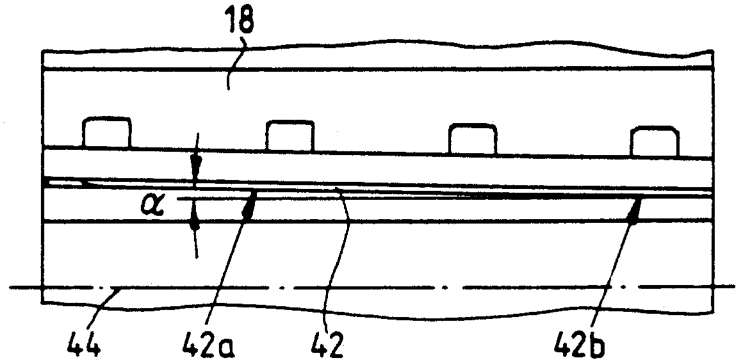
FIG. 6 is a fragmentary view of the knife carrier substantially as seen in the direction of arrow VI in FIG. 2.

It is preferred to select the orientation of the axis of the shaft 65 in such a way that the axis is parallel to the adjacent cutting edge 42 of a knife 41, i.e., the axis of the shaft 65 is inclined with reference to the axis 44 through an angle which equals or approximates the angle alpha shown in FIG. 6. Moreover, the inclination of the axis of the shaft 65 preferably also matches the inclination of the adjacent cutting edge 42 through the angle beta (shown in FIG. 5). Such orientation of the axis of the shaft 65 ensures that the cleaning action of the bristles 66a is uniform all the way between the end portions 42a, 42b of each cutting edge 42.

In order to prevent premature clogging of bristles 66a with impurities which are removed from successive knives 41, the severing apparatus 16 preferably further comprises means 64 for collecting and disposing of impurities which are gathered by the bristles 66a of the brush 66. The collecting or disposing means 64 which is shown in FIG. 2 comprises a cylindrical brush 67 having an annulus of bristles 67 with tips contacting the tips of bristles 66a or penetrating into the annulus of bristles forming part of the brush 66.

The position of the brush 67 is selected in such a way that its bristles 67a orbit along an endless path which is located radially outwardly of the path of cutting edges 42 to thus avoid direct contact between the brush 67 and the knives 41. The brush 67 can but need not be positively driven; it is presently preferred to mount the shaft 75 of the brush 67 (or to mount the brush 67 on the shaft 75) in such a way that the brush 67 is rotated as a result of engagement of its bristles 67a with the bristles 66a of the positively driven brush 66. All that is necessary to achieve satisfactory removal of impurities from the bristles 66a of the brush 66 is to ensure that the tips of the bristles 67a will penetrate into the annulus of bristles 66a through a distance of 1 to 2 mm.

The brush 67 can further serve as a means for lubricating the bristles 66a of the brush 66 with a substance which reduces the likelihood of strong or even permanent adherence of adhesive to the bristles 66a.

The brush 67 of the collecting means 64 rotates relative to a stationary stripping device 68 which expels accumulated impurities from the bristles 67a and directs them into a channel or trough 69a defined by a shroud 69 which is mounted on or forms part of the frame of the filter tipping machine and overlies the brushes 66, 67. The shroud 69 can be said to constitute a housing which encapsulates the cleaning means 63 and the collecting means 64 in order to prevent the bristles 66*a* and/or 67*a* from propelling impurities into the area around the severing apparatus 16.

The core of the second brush 67 is preferably mounted on the shaft 75 in such a way that it can be readily slipped onto or off this shaft (in a direction toward or away from the observer of FIG. 2) so as to facilitate convenient cleaning and lubrication of the bristles 67*a* or replacement of the brush 67 with a spare brush.

As mentioned above, the device 33 serves to change the length of the path of movement of the web 12 from the paster 14 toward the counterknife 17 in order to ensure that the severing apparatus 16 will establish gaps between successively formed uniting bands 38, and more particularly between successively formed uniting bands and the leader of the remaining portion of the web. The operation of the web advancing means including the device 33 is such that the average speed of the web 12 in its path between the paster 14 and the counterknife 17 is less than the (normally constant) peripheral speed of the counterknife. The device 33 ensures that the speed of the leader of the web 12 matches or very closely approximates the peripheral speed of the counterknife 17 when one of the knives 41 cooperates with the adjacent internal surface 37 of the counterknife to sever the web, and that the speed of forward movement of the severed web is reduced immediately after completion of a cut to thus establish a gap or clearance between the separated uniting band 38 and the adjacent freshly formed leader of the web 12.

Figure 4:
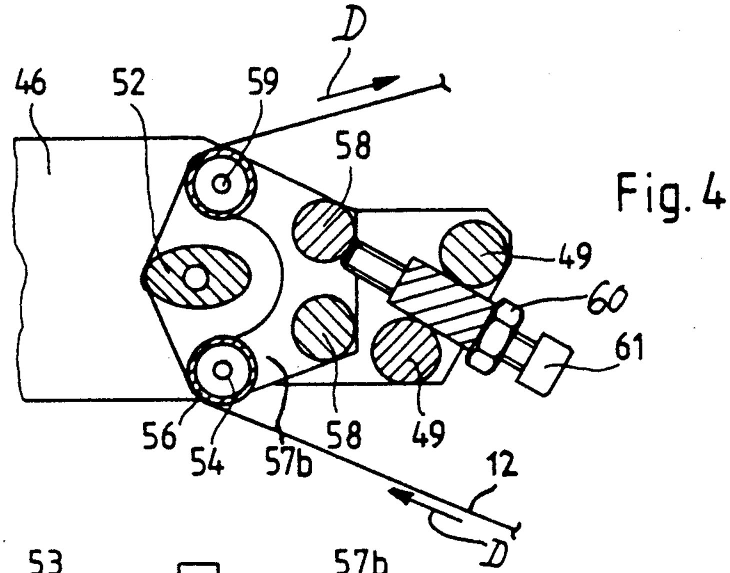
FIG. 4 is a sectional view substantially as seen in the direction of arrows from the line IV—IV of FIG. 3.
Figure 3:
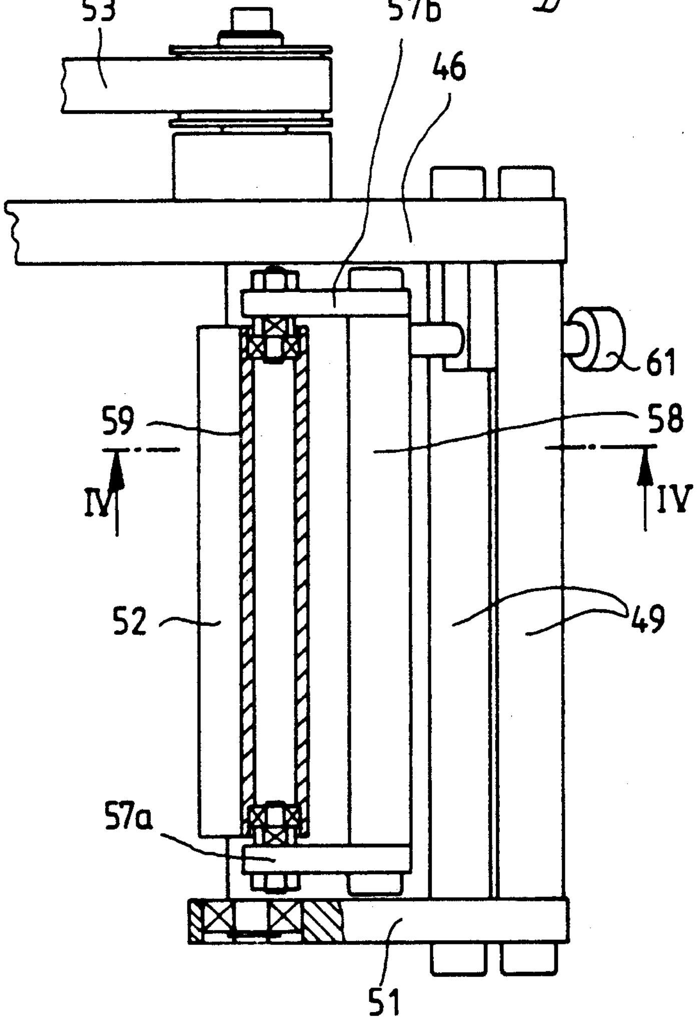
FIG. 3 is a top plan view of the web advancing means substantially as seen in the direction of arrow III in FIG. 2, with one of the web guides shown in an axial sectional view.

The device 33 of FIGS. 2, 3 and 4 comprises a plate-like support 46 which is pivotably mounted on a shaft 47 in the frame of the filter tipping machine. The shaft 47 can constitute the main drive shaft of the filter tipping machine and can serve to transmit torque to the applicator 32 of the paster 14 (note the phantom line 32*a* which is intended to represent an operative connection between the shaft 47 and the applicator 32). The means for pivoting the support 46 relative to the shaft 47 includes a motor 48 (e.g., a hydraulic or pneumatic cylinder and piston unit) which can be actuated to pivot the support 46 in a counterclockwise direction (as seen in FIG. 2) in order to disengage the web 12 from the applicator 32 of the paster 14 when the filter tipping machine is idle or when the severing apparatus 16 is arrested for any other reason.

As can be best seen in FIGS. 3 and 4, the support 46 carries a plate-like bearing member 51 which is attached thereto by several elongated distancing elements 49 in the form of parallel bolts or studs. The support 46 is or can be parallel to the bearing member 51. One end portion of an elongated rotary eccentric 52 is journalled in the support 46, and the other end portion of this eccentric is journalled in the bearing member 51. The illustrated eccentric 52 has an elliptical cross-sectional outline and is driven in synchronism with the counterknife 17 and knife carrier 18 by a driving or torque transmitting unit 53 which is indicated in FIG. 2 by a phantom line 53 and derives motion from the shaft 47. The unit 53 can include an endless belt transmission (see FIG. 3).

It will be appreciated that the illustrated operative connections 32*a* and 53 between the shaft 47 (i.e., the prime mover of the filter tipping machine) on the one hand, and the applicator 32 and eccentric 52 on the other hand can be replaced with discrete prime movers which can rotate the applicator 32 and the eccentric 52 in synchronism with the counterknife 17 and carrier 18.

The support 46 cooperates with the bearing member 51 to mount the respective end portions of an elongated shaft or stud 54 for a rotatable guide roll 56 at a level beneath and at one side of the eccentric 52. The shaft 54 further supports two arcuate arms 57*a*, 57*b* which support the end portions of a second rotatable guide roll 59 at the other side of the eccentric 52. The arms 57*a*, 57*b* are rigidly connected to the end portions of several elongated distancing elements 58 which cooperate with the arms to form a yoke-like holder for the guide roll 59.

The web 12 advances from the applicator 32 and is trained over the lower guide roll 56, thereupon over the eccentric 52 and finally over the upper guide roll 59 on its way toward the peripheral surface of the counterknife 17 (note the arrows D in FIGS. 2 and 4). Thus, as the eccentric 52 rotates about its axis in response to transmission of torque from the shaft 47 via operative connection 53, it alternately shortens and lengthens the path of movement of the web 12 between the applicator 32 and the counterknife 17. The arrangement is such that the path is shortened just before a knife 41 is about to make a cut across the leader of the web 12 so that the speed of forward movement of the web is increased and the suction ports 34 are free to prevent the leader of the web from slipping relative to the peripheral surface of the counterknife 17 (the speed of the accelerated web 12 then equals or very closely approximates the peripheral speed of the counterknife 17). As the eccentric 52 rotates about its axis in synchronism with rotation of the counterknife 17, it lengthens the path for the web 12 immediately after the making of a cut is completed so that the peripheral surface of the counterknife then slips relative to the leader of the web and the severing apparatus 16 automatically establishes a gap between the separated uniting band 38 and the front edge face of the freshly formed leader of the web 12.

The device 33 further comprises means for changing the position of the guide roll 59 relative to the counterknife 17. Such position changing means comprises a threaded adjusting member 61 (e.g., a screw or bolt) which mates with a portion of the support 46 and has a shank with a free end portion engaging one of the distancing elements 58 between the arms 57*a*, 57*b*. A lock nut 60 is provided to fix the adjusting member 61 in a selected position. This adjusting member 61 can pivot the arms 57*a*, 47*b* about the axis of the shaft 54 for the guide roll 56 to thus change the extent to which the rotating eccentric 52 can shorten and lengthen the path of movement of the web 12 between the applicator 32 of the paster 14 and the counterknife 17. In this manner, the adjusting member 61 can influence the width of gaps between successively formed uniting bands 38 and the web 12 and/or the length of uniting bands 38.

The illustrated adjusting member 61 can be replaced with other suitable adjusting means, e.g., with a motor-driven adjusting member, with a handle which is attached to one of the arms 57*a*, 57*b* or to one of the distancing elements 58 and can be arrested in any one of a plurality of a different positions each corresponding to a different position of the guide roll 59 relative to the eccentric 52, or the like.

The guide rolls 56, 59 (or at least one of these guide rolls) can be replaced with non-rotatable guide means for the web 12. For example, at least one of the guide rolls 56, 59 can be replaced with a non-rotatable rod which is fixedly connected to the arms 57*a* and 57*b* and engages the web 12 upstream or downstream of the eccentric 52.

An important advantage of the adjusting member 61 or an equivalent adjusting means is that the dimensions of the uniting bands 38 and/or the width of the gaps between successively formed uniting bands and the leader of the web 12 can be altered without any, even partial, dismantling of the severing apparatus 16 and/or filter tipping machine. Moreover, such adjustments can be carried out without necessitating the replacement of a single component of the severing apparatus 16.

FIG. 2 further shows a scraper 62 which is adjacent the peripheral surface of the counterknife 17 downstream of the web severing station (as seen in the direction of arrow A) and serves to strip uniting bands 38 off the peripheral surface of the counterknife if a uniting band happens to advance beyond the transfer conveyor 11 of FIG. 1 because it is not picked up by an oncoming group of coaxial rod-shaped articles or because the transfer conveyor 11 fails to receive such groups from the assembly conveyor 3 of the filter tipping machine.

The utilization of knives 41 with straight cutting edges 42 mounted in such a way that at least those knife portions which are provided with the cutting edges are free to move in the circumferential direction of the carrier 18 against the opposition of a restoring force contributes to simplicity of the knives and to lower manufacturing and assembly cost. In addition, such mounting of the knives 41 ensures the making of clean cuts all the way between the two marginal portions of the running web 12.

An advantage of an eccentric having a substantially elliptical cross-sectional outline is that such eccentric can be produced at a low cost. In addition this eccentric has been found to ensure gradual acceleration and deceleration of the web 12 without excessive agitation of the web. Agitation can affect the quality of the cuts and can interfere with the making of uniting bands 38 of predictable length. Moreover, it has been found that the illustrated eccentric 52 will ensure predictable shortening and lengthening of the path for the web 12 ahead of the counterknife 17 even if the filter tipping machine is operated at a very high speed, i.e., even if the knives 41 on the carrier 18 are called upon to sever the leader of the web 12 at a high or very high frequency such as is necessary in a modern filter tipping machine which turns out many thousands of filter cigarettes per minute.

The improved severing apparatus is susceptible of many additional modifications. For example, the adjusting member 61 or an equivalent adjusting means can be designed to move both guide rolls (56, 59) or analogous web guiding means relative to the eccentric 52 when it becomes necessary to change the width of the aforementioned gaps and/or to change the length of uniting bands 38.

The placing of the eccentric 52 between the paster 32 and the counterknife 17 exhibits the advantage that fluctuations of the speed of the web 12 cannot influence the application of adhesive to one side of the web, i.e., fluctuations of the speed of the web take place downstream of the adhesive applying station.

The improved severing apparatus 16 generates little noise because the knives 41 cooperate with the internal surfaces 37 of the counterknife 17 to sever the web not unlike the blades of a pair of scissors. This is in contrast to the severing action of knives in the aforediscussed U.S. Pat. No. 4,485,710 to Schlisio et al. Moreover, the quality of cuts is superior to that which can be achieved with conventional web severing apparatus because the knives 41 are continuously cleaned so that adhesive which is gathered by the cutting edges 42 during the making of a preceding cut cannot adversely influence the making of the next-following cut with the same cutting edge. Pronounced reduction of noise is achieved on the additional ground that the cutting edges 42 of the knives 41 are in mere point contact with the respective internal surfaces 37 during each and every stage of the making of a cut.

The number of knives 42 equals n wherein n is a whole number including one. The number of grooves 36 may but need not match the number of knives 41.

The severing apparatus 16 can be furnished without the cleaning means 63 and without the collecting means 64 (or such cleaning and collecting means can be deactivated) if the knives 41 are called upon to cooperate with the surfaces 37 to sever webs which are not coated with films of adhesive. Furthermore, the device 33 can be omitted or deactivated if the freshly separated portions of the web need not be spaced apart from the leader of the remainder of the web.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for separating uniting bands from the leader of a running web of tipping paper, one side of which is coated with adhesive, in a filter tipping machine of the tobacco processing industry, comprising a drum-shaped counterknife having a peripheral surface and being rotatable about a predetermined axis, said counterknife further having at least one substantially axially parallel groove provided in said peripheral surface in parallelism with said axis, and an internal surface flanking one side of said at least one groove; means for supplying the web to said counterknife so that the leader of the web overlies a predetermined portion of said peripheral surface; and a rotary carrier adjacent said counterknife and provided with at least one knife having an elongated cutting edge arranged to penetrate into said groove once during each revolution of said carrier to sever the web in cooperation with said internal surface, said cutting edge being yieldable in the circumferential direction of said carrier.

2. The apparatus of claim 1, wherein said cutting edge is inclined with reference to the axis of said carrier in the radial direction of the carrier.

3. The apparatus of claim 1, wherein said cutting edge is inclined with reference to the axis of the carrier in the circumferential direction of the carrier.

4. The apparatus of claim 3, wherein said cutting edge is substantially straight.

5. The apparatus of claim 1, wherein said knife consists of resilient material.

6. The apparatus of claim 1, further comprising means for rotating said counterknife in a predetermined direction, said internal surface being located ahead of said at least one groove in said direction.

7. The apparatus of claim 6, wherein the orientation of said cutting edge and said internal surface is such that the cutting edge is in point contact with said internal surface during severing of the web and the point of contact travels from one end toward the other end of said cutting edge.

8. The apparatus of claim 1, wherein said supplying means includes means for advancing the web longitudinally at a predetermined average speed, and further comprising means for rotating said counterknife at a peripheral speed greater than said average speed.

9. The apparatus of claim 1, further comprising means for rotating said counterknife at a predetermined speed, said supplying means including means for advancing the web toward said peripheral surface at a plurality of speeds including a higher speed which at least closely approximates said predetermined speed during severing of the web and a lower speed upon completion of a cut so that a gap develops between the web and the web portion which is severed therefrom.

10. The apparatus of claim 9, further comprising means for applying adhesive to one side of the running web, said advancing means including a portion which is disposed between said adhesive applying means and said counterknife.

11. Apparatus for repeatedly severing a running web, particularly for separating uniting bands from the leader of a web of tipping paper in a filter tipping machine of the tobacco processing industry, comprising a drum-shaped counterknife having a peripheral surface and being rotatable about a predetermined axis, said counterknife further having at least one groove provided in said peripheral surface in parallelism with said axis, and an internal surface flanking one side of said at least one groove; means for supplying the web to said counterknife so that the leader of the web overlies a predetermined portion of said peripheral surface; and a rotary carrier adjacent said counterknife and provided with at least one knife having an elongated cutting edge arranged to penetrate into said groove once during each revolution of said carrier to sever the web in cooperation with said internal surface, said knife comprising a guide which enters said groove ahead of said cutting edge and locates said cutting edge with reference to said internal surface.

12. The apparatus of claim 11, wherein said guide includes a tooth-shaped protuberance at one end of said elongated cutting edge.

13. Apparatus for repeatedly severing a running web, particularly for separating uniting bands from the leader of a web of tipping paper in a filter tipping machine of the tobacco processing industry, comprising a drum-shaped counterknife having a peripheral surface and being rotatable about a predetermined axis, said counterknife further having at least one groove provided in said peripheral surface in parallelism with said axis, and an internal surface flanking one side of said at least one groove; means for rotating said counterknife at a predetermined speed; means for supplying the web to said counterknife so that the leader of the web overlies a predetermined portion of said peripheral surface; and a rotary carrier adjacent said counterknife and provided with at least one knife having an elongated cutting edge arranged to penetrate into said groove once during each revolution of said carrier to sever the web in cooperation with said internal surface, said supplying means including means for advancing the web toward said peripheral surface at a plurality of speeds including a higher speed which at least closely approximates said predetermined speed during severing of the web and a lower speed upon completion of a cut so that a gap develops between the web and the web portion which is severed therefrom, said advancing means defining for the web an elongated path extending to said peripheral surface and said counterknife and said advancing means including means for varying the length of said path in synchronism with rotary movement of said counterknife.

14. The apparatus of claim 13, wherein the means for varying the length of said path includes a rotary eccentric and said advancing means further comprises two web guides flanking said eccentric, the web being trained over said eccentric and at least one of said web guides.

15. The apparatus of claim 14, wherein said eccentric has a substantially elliptical cross-sectional outline.

16. The apparatus of claim 14, further comprising means for adjusting the positions of said at least one guide and said eccentric relative to each other to thereby change the extent of variation of the length of said path.

17. Apparatus for repeatedly severing a running web, particularly for separating uniting bands from the leader of a web of tipping paper in a filter tipping machine of the tobacco processing industry, comprising a drum-shaped counterknife having a peripheral surface and being rotatable about a predetermined axis, said counterknife further having at least one groove provided in said peripheral surface in parallelism with said axis, and an internal surface flanking one side of said at least one groove; means for supplying the web to said counterknife so that the leader of the web overlies a predetermined portion of said peripheral surface; a rotary carrier adjacent said counterknife and provided with at least one knife having an elongated cutting edge arranged to penetrate into the groove once during each revolution of said carrier to sever the web in cooperation with said internal surface; and means for cleaning the cutting edge of said at least one knife.

18. The apparatus of claim 17, further comprising means for collecting impurities which are removed from the knife by said cleaning means.

19. The apparatus of claim 17, wherein said cleaning means comprises a rotary brush having bristles arranged to sweep at least along the major part of the length of the cutting edge of said at least one knife.

20. The apparatus of claim 19, further comprising means for rotating said brush.

21. The apparatus of claim 17, wherein said cleaning means comprises a first rotary brush having bristles arranged to sweep along said cutting edge and to remove impurities, if any, from said knife, and further comprising means for removing impurities, including a second rotary brush having bristles arranged to sweep impurities away from the bristles of said first brush.

22. The apparatus of claim 21, wherein said brushes are cylinders and are rotatable about parallel axes, the distance between the axes of said brushes being less than the sum of radii of said brushes.

23. The apparatus of claim 21, wherein said second brush is located radially outwardly of the path of movement of said cutting edge about the axis of said carrier.

24. The apparatus of claim 21, further comprising means for rotating said first brush, said second brush being driven by said first brush.

* * * * *